Nov. 2, 1965 T. R. MAYHEW 3,215,854

DIFFERENCE AMPLIFIER INCLUDING DELAY MEANS AND TWO-STATE DEVICE SUCH AS TUNNEL DIODE

Filed Jan. 26, 1962

INVENTOR.
THOMAS R. MAYHEW
BY Samuel Cohen
ATTORNEY 3,215,854

DIFFERENCE AMPLIFIER INCLUDING DELAY MEANS AND TWO-STATE DEVICE SUCH AS TUNNEL DIODE

Thomas R. Mayhew, Levittown, N.J., assignor to Radio Corporation of America, a corporation of Delaware Filed Jan. 26, 1962, Ser. No. 168,887
10 Claims. (Cl. 307—88.5)

The present invention relates to a difference amplifier. While such amplifiers have many applications, the present one is especially suitable for use as the sense amplifier for the memory of a high speed digital computer.

A difference amplifier has two input terminals and produces an output which is a function of the difference in amplitude between the signals applied to these terminals. When used as the sense amplifier for a memory, the sense winding of the memory may be connected at one end to one of the input terminals and at the other end to the other input terminal. The sense windings are so arranged that when a signal is induced therein, it increases the voltage (or current) applied to one or the other of the input terminals and decreases the voltage (or current) applied to the remaining input terminal.

An object of the present invention is to provide an improved difference amplifier having two well defined output stable states. These two stable states ordinarily represent the binary digits "one" and "zero," respectively.

Another object of the invention is to provide an amplifier having high alternating-current gain for low amplitude input signals.

Another object of the invention is to provide a difference amplifier which is relatively insensitive to drift in the operating characteristics of the amplifying elements, such as transistors, of the difference amplifier.

Another object of the present invention is to provide an amplifier having quick recovery time. Such an amplifier is especially suitable for amplifying short duration input signals which occur after large, unbalanced, high repetition rate voltage transients, as obtained when reading out the contents of a high speed memory. The large sense signal may occur during the write operation and the sense amplifier may then have to recover in time for the following read operation.

The amplifier of the invention includes two amplifier elements each having three electrodes, namely a control electrode, a charge carrier emitting electrode and a charge carrier collecting electrode. The input signals are applied to the control electrodes. The charge carrier emitting electrodes are connected to a common direct-current impedance element. The two charge carrier collecting electrodes are connected one directly and the other through a delay means to a common point. A two state circuit element such as a tunnel diode is connected between this common point and a source of operating voltage for the amplifier elements. The output from the circuit may be taken from across the two state circuit element.

The invention is described in greater detail below and is illustrated in the following drawings of which:

There are two recovery times which must be considered in the design of a sense amplifier for a memory. One is the recovery time of the sense line itself with the sense amplifier across it and the other is the internal recovery time of the sense amplifier. The present invention is concerned with the sense amplifier and its recovery time. However, the problem of the sense line recovery time is of interest and will be discussed briefly first.

The recovery time of a sense line depends upon the line configuration and certain other factors. Typically, the sense line is a zig-zag winding which passes through the magnetic cores of the memory. In general, the line can be thought of as an inductor and its recovery time is determined by the resistance of the line, that is, by the $L/R$ time constant of the line. This means that for fast recovery L, the inductance, should be small and R, the resistance, should be large. The resistance of the line is determined by the sense amplifier input resistance and any terminating resistors across the line. However, if the total resistance across the line is too high, then shunt capacities become important, the line becomes an RLC circuit, where C is capacitance, and ringing becomes a problem. Therefore, the total resistance across the line is normally limited to some moderate value such as 300 ohms and an attempt is made to keep the line inductance at a minimum so that the $L/R$ time constant is small. The direct-current resistance of the sense line itself is the resistance of a wire and is in a range of milliohms. If the inductance is relatively small, then the line may be represented by a voltage source. In the interest of simplifying the discussion which follows, the sense line is approximated by a voltage source such as 10, 12 in FIG. 1.

Figure 1:
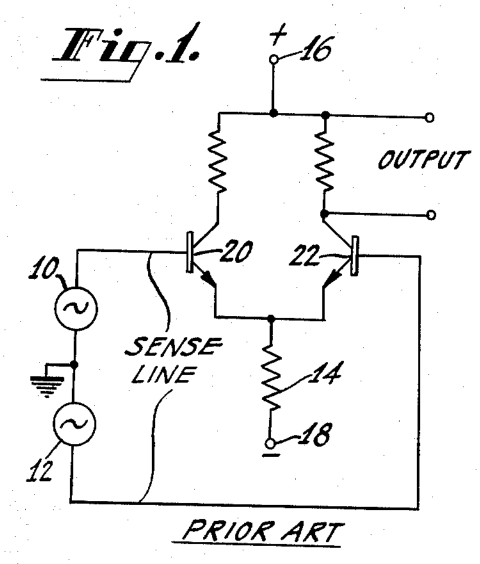
FIG. 1 is a schematic diagram of a prior art direct-current coupled difference amplifier.
Figure 2:
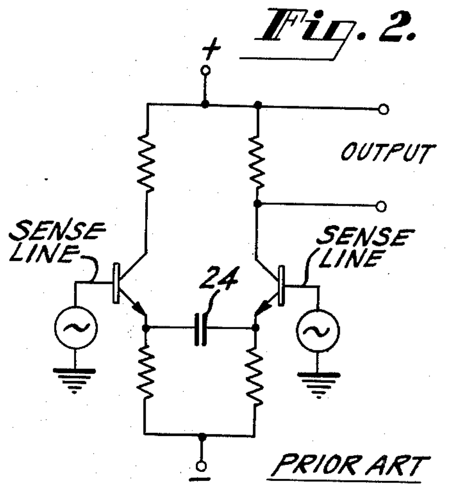
FIG. 2 is a schematic drawing of a prior art alternating-current coupled difference amplifier.

Assuming that the sense line has been well designed and well terminated, the next important factor to be considered is the recovery time of the sense amplifier itself. There are two types of sense amplifiers which are generally used, namely the direct-current coupled amplifier such as shown in FIG. 1 and the alternating-current coupled amplifier such as shown in FIG. 2. Each has its advantages and disadvantages and neither one is ideal.

In the direct-current coupled amplifier of FIG. 1, the resistor 14 and the voltage source coupled to terminal 18 and ground through transistors 20 and 22 and voltage sources 10 and 12 together provide a constant current source. Ideally, the current passing through resistor 14 should divide equally between transistors 20 and 22. However, in practice, this condition is difficult to achieve for long periods. The transistors 20 and 22 may be slightly unbalanced. Further, differences in temperature, operating voltage, aging and so on easily unbalance the circuit. The balance of the circuit of FIG. 1 can be improved if a small resistor is added in series with each emitter electrode. This provides some degeneration and improves the circuit stability. However, the degeneration reduces the amplifier gain and this is disadvantageous.

The operation of the circuit of FIG. 1 is straightforward. If, for example, a negative signal is applied to the base of one of the transistors, that transistor draws less current. This causes the current from the constant current source to steer into the other transistor and to produce a change in voltage at the output. If one signal goes positive at the same time as the other goes negative, as is the case in many circuit configurations, the response is improved. The circuit of FIG. 1 does have high gain and fast recovery, however, the lack of stability of the circuit is a serious disadvantage. Any slight unbalance in the circuit causes an output signal to be produced and, in many applications, such a signal may produce an erroneous output indication.

The alternating-current coupled difference amplifier of FIG. 2 does have the advantage of producing well defined discrete output current levels. Further, high alternating-current gain is obtained by virtue of the capacitor 24 coupling the two emitters together. A signal applied to one transistor to increase is conduction causes the emitter of that transistor to couple a signal to the emitter of the other transistor in a sense to reduce the conduction of the other transistor. The reverse occurs when the input signal to a transistor causes that transistor to conduct less heavily. However, the circuit of FIG. 2 does have recovery time problems. The recovery time is determined by the coupling capacitor, the current determining resistors connected to the emitters of the transistors, and the base-to-emitter impedance of the transistors. Normally, the capacitor is made very large and the circuit is used where large input transients are not long enough to let the capacitor charge to any great extent. However, if an input transient is very long so that one of the transistors is turned off for a long time, the capacitor will build up a large charge and it will take time to discharge the capacitor when the input transient is removed. This time is the recovery time of the circuit.

If the capacitor 24 is made small so that the recovery time is small, then the capacitor tends to discharge during the time of a low amplitude input signal, and the output current has a noticeable RC decay period. It is difficult to design a suitable alternating-current coupled difference amplifier if it is desired that the circuit have a recovery time which is of the same order of magnitude as the width of low amplitude input signals. Accordingly, even though the circuit of FIG. 2 has certain advantages, it is not suitable for use in applications in which large unbalanced input transients occur at high repetition rates prior to input signals of short duration and of relatively low amplitude.

Figures 3, 4:
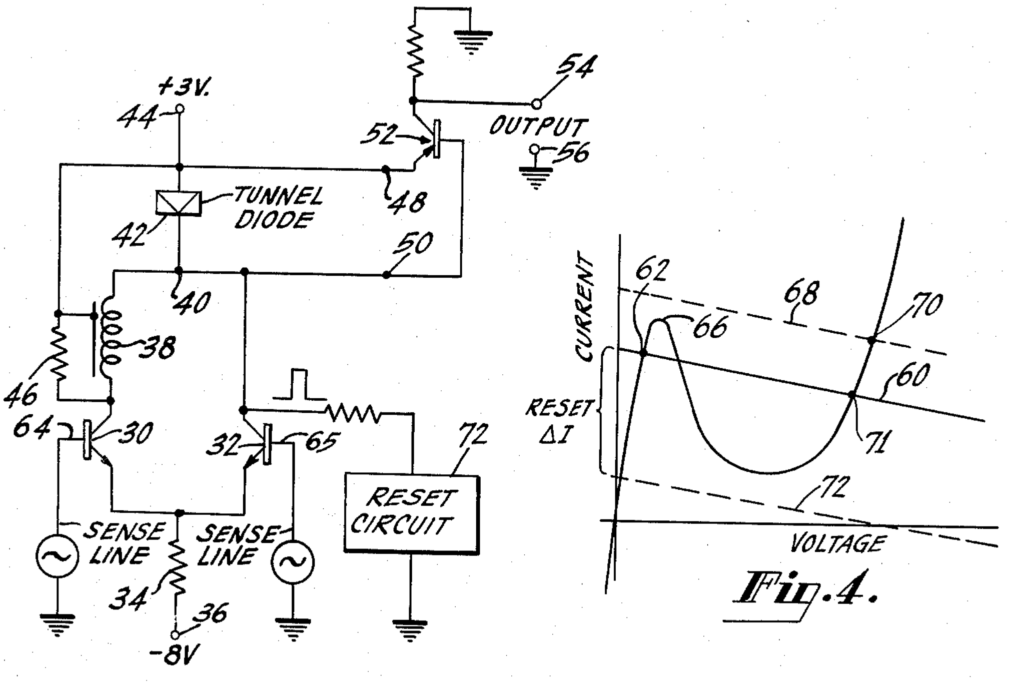
FIG. 3 is a block and schematic circuit diagram of the difference amplifier of the present invention.
FIG. 4 is a characteristic of current versus voltage for the tunnel diode shown in FIG. 3.

The circuit of an embodiment of the present invention is shown in FIG. 3. It includes a pair of transistors 30 and 32. The emitters of the transistors are connected through a resistor 34 to a terminal 36 for a negative voltage supply. The collectors of the transistors are connected one directly and the other through a delay line 38 to a common point 40. A tunnel diode 42 is connected at its cathode to the common point 40 and its anode to terminal 44 for a positive voltage source for the transistors. The relay line 38 is terminated at its input end by a resistor 46 having an impedance which is equal to the characteristic impedance of the delay line.

The output of the circuit of the difference amplifier is available at terminals 48 and 50. Terminal 48 is connected to the emitter of a transistor 52 and terminal 50 is connected to the base of the transistor. The amplified output signal is available at terminals 54 and 56.

In the operation of the circuit of FIG. 3, the transistors 30 and 32 initially conduct approximately equal currents. The tunnel diode is initially in the low voltage state. The resistance of resistor 34 added to the small resistance of the conducting transistors is much larger than the positive resistance of the tunnel diode. Accordingly, the tunnel diode may be considered to be operated by a constant current source, as indicated schematically by the load line 60 in FIG. 4. In this figure, the initial operating point is at 62.

The tunnel diode 42 may, for example, be a germanium tunnel diode. At operating point 62, the emitter-to-base voltage of the output transistor 52 is lower than that which will permit substantial conduction through the transistor. Accordingly, the output voltage available at terminals 54, 56 is substantially 0 volts.

Assume now that the signal applied to the base 64 is made more negative. This decreases the current flowing through transistor 30 and increases the current flowing through transistor 32. The decrease in current through transistor 30 is delayed from reaching the common terminal 40 by the delay line 38. However, the increase in current through transistor 32 appears immediately at terminal 40. Accordingly, the effect of making the signal on base 64 more negative is to increase the current flowing through the tunnel diode. The tunnel diode is biased close to its current peak 66 and the circuit parameters are so arranged that the increase in current through the tunnel diode switches the tunnel diode to its high state. This is shown schematically in FIG. 4 by the dashed load line 68 and the new operating point 70.

When the tunnel diode switches to its high state, its output voltage changes from some 30 or 40 millivolts to some 350 to 400 millivolts. This voltage is sufficient to drive transistor 52 into conduction and a well defined output appears at terminals 54, 56.

The tunnel diode 42 has a very low resistance compared to the characteristic impedance of line 38. When the diode switches to its high state, it reflects the change in voltage which develops across the diode back to the delay line. However, the delay line is terminated at its input end in resistor 46 which has a resistance equal to the characteristic resistance of the delay line. Accordingly, this reflected signal is absorbed and does not interfere with the circuit operation.

The same type of operation as described above can be obtained by making the signal on base 65 more positive, or by making base 64 more negative at the same time as base 65 is made more positive. Also, one or the other of bases 64 and 65 may be permanently connected to some reference voltage point such as ground and the signal on the other base varied in a sense to switch the tunnel diode to its high state.

After a sense signal has been sensed by the difference amplifier of FIG. 3, the tunnel diode 42 remains in its high state. The new quiescent operating point is at 71. The delayed sense signal is not large enough to switch the tunnel diode back to the low voltage state. It is therefore necessary to reset the circuit before the next sense pulse occurs. The reset circuit is shown in FIG. 3 by block 72. It may be a transistorized circuit and it applies a positive pulse to the cathode of the tunnel diode thereby resetting the tunnel diode to its low state. The reset current is shown schematically in FIG. 4 as a shift in the load line from 60 to 72. The latter intersects only the low voltage state of the tunnel diode. The reset circuit may be synchronized with the other circuits in the computer by one of the clock pulses from the computer. The reset current may be made large enough so that large undesirable input voltage transients will not switch the tunnel diode to the high state during the reset time.

One important advantage of the circuit of FIG. 3 is that it has a well defined output which is at one of two levels. Small amounts of drift in the transistors 30 and 32 do not affect the output. They may possibly cause the operating point 62 to move to a different position in the low voltage state of the tunnel diode, however, the voltage across the tunnel diode remains substantially constant. Moreover, a slight variation, say from 20 millivolts to 40 millivolts in the tunnel diode voltage still has no appreciable effect on the transistor 52 since the latter remains below its threshold for operation. In addition, an unbalance in the characteristics of the transistors 30 and 32 does not affect the operating point 62 of the tunnel diode because substantially all of the current in the resistor 34 goes through the tunnel diode even though it might not divide equally between transistors 30 and 32.

Another important advantage of the circuit of FIG. 3 is that it has high alternating-current gain for relatively small input signals of short duration. The tunnel diode is biased relatively close to its current peak and a relatively small input signal unbalances the two transistors sufficiently to cause the tunnel diode to switch to its high voltage state. However, the diode is not biased so close to its peak that circuit drift unbalances the circuit. In one practical circuit, a 5 milliampere peak tunnel diode was used which was biased at 4.5 milliamperes.

Another advantage of the circuit of FIG. 3 is that it has fast recovery because there are no reactive elements in the circuit other than the delay line. The delay introduced by the delay line can be relatively short. In one practical circuit the delay line length was made 0.1 microsecond.

Another advantage of the circuit of FIG. 3 is that the gain of the circuit for large signals is limited by the tunnel diode. In other words, if a large input signal is applied to one of the transistors, the tunnel diode switches to a value of voltage not substantially different from that to which the tunnel diode switches in response to a relatively small signal. Thus, the system does not conduct so heavily as to cause blocking in the stages following the difference amplifier.

A practical circuit according to the invention may have the following values of circuit elements. These are given by way of example but are not to be taken as limiting.

Transistors 30 and 32—Type 2N706
Transistor 52—Type 2N501
Tunnel diode 42—Germanium having a 5 milliampere peak
Delay line 38—introduces a delay of 0.1 microsecond
Resistor 34—1800 ohms
Resistor 46—1200 ohms

What is claimed is:

1. A difference amplifier comprising two amplifier elements, each having three electrodes, namely a control electrode, a charge carrier emitting electrode and a charge carrier collecting electrode; terminals at the control electrodes for applying input signals thereto; a common direct current impedance element connected to the charge carrier emitting electrodes of both of said amplifier elements; delay means; a common third terminal connected directly to one of the charge carrier collecting electrodes and through said delay means to the other of said charge carrier collecting electrodes; fourth and fifth terminals to which an operating voltage for both amplifier elements may be applied, said fourth terminal connected to said common direct current impedance element; and a two state circuit element connected to receive substantially the sum of the currents passing through the two amplifier elements between said fifth terminal and said common third terminal.

2. A difference amplifier comprising two amplifier elements each having three electrodes, namely a control electrode, a charge carrier emitting electrode and a charge carrier collecting electrode; terminals at the control electrodes for applying input signals thereto; a common direct current impedance element connected to the charge carrier emitting electrodes of both of said amplifier elements; delay means; a common third terminal connected directly to one of the charge carrier collecting electrodes and through said delay means to the other of said charge carrier collecting electrodes; fourth and fifth terminals to which an operating voltage for both amplifier elements may be applied, said fourth terminal connected to said direct current impedance element; and a voltage controlled negative resistance element connected between the said fifth voltage and said common terminal.

3. A difference amplifier comprising, in combination, a pair of transistors each having a base electrode, an emitter electrode and a collector electrode; connections to said base electrodes for applying input signals thereto; two terminals across which an operating voltage for the transistors may be applied; a direct current impedance element connected between one of said terminals and a common connection to which both of said emitter electrodes are connected; a delay means; a second common connection directly connected to one of said collector electrodes and connected through said delay means to the other of said collector electrodes; and a two state circuit element connected between said second common connection and the other terminal for said operating voltage source and receiving substantially the sum of the currents passing through the pair of transistors.

4. A difference amplifier comprising, in combination, a pair of transistors each having a base electrode, an emitter electrode and a collector electrode; connections to said base electrodes for applying input signals thereto; two terminals across which an operating voltage for the transistors may be applied; a direct current impedance element connected between one of said terminals and a common connection to which both of said emitter electrodes are connected; a delay means; a second common connection directly connected to one of said collector electrodes and connected through said delay means to the other of said collector electrodes; and a tunnel diode connected between said second common connection and the other terminal for said operating voltage source.

5. A difference amplifier comprising, in combination, a pair of transistors each having a base electrode, an emitter electrode and a collector electrode; connections to said base electrodes for applying input signals thereto; two terminals across which an operating voltage for the transistors may be applied; a direct current impedance element connected between one of said terminals and a common connection to which both of said emitter electrodes are connected; a delay means; a second common connection directly connected to one of said collector electrodes and connected through said delay means to the other of said collector electrodes; a terminating impedance equal in value to the characteristic resistance of said delay means connected across the input end of said delay means and a tunnel diode connected in the forward direction between said second common connection and the other terminal for said operating voltage source.

6. A difference amplifier comprising, in combination, a pair of transistors each having a base electrode, an emitter electrode and a collector electrode; connections to said base electrodes at which input signals may be applied; two terminals across which an operating voltage for the transistors may be applied; a direct current impedance element connected between one of said terminals and a common connection to which both of said emitters are connected; a delay means; a second common connection directly connected to one of said collectors and connected through said delay means to the other of said collectors; a tunnel diode connected in the forward direction between said second common connection and the other terminal for said operating voltage source; and a transistor, the emitter to base diode of which is connected across said tunnel diode.

7. A difference amplifier comprising two amplifier elements, each having three electrodes, namely a control electrode, a charge carrier emitting electrode and a charge carrier collecting electrode; two terminals, one at each control electrode, across which a difference in signal voltage may be applied; third and fourth terminals across which an operating voltage may be applied; a first common connection to which said charge carrier emitting electrodes are coupled; delay means; a second common connection connected directly to one of the charge carrier collecting electrodes and through said delay means to the other of said charge carrier collecting electrodes; a current responsive two state circuit element connected between said third terminal and said second common connection for receiving substantially the sum of the currents passing through the two amplifier elements; and means coupling said fourth terminal to said first common connection.

8. A difference amplifier comprising, in combination:

two amplifier elements, each having a signal input terminal;

an operating voltage source connected to said amplifier elements for causing currents to flow through said elements;

a two-state circuit element connected to said amplifier elements for receiving substantially the sum of the currents passing through the two amplifier elements;

a delay means connected between solely one of the amplifier elements and the two-state circuit element for receiving the current passing through said one amplifier element;

and means coupled to the two amplifier elements for applying a difference in signal potential across the signal input terminals of said two amplifier elements for causing the current distributed between them to vary, whereby the resulting change in current through the delay means is delayed from reaching the two-state circuit.

9. A difference amplifier comprising, in combination:

two amplifier elements, each having a signal input terminal;

an operating voltage source connected to said elements for causing currents to flow through said elements;

a two-state, negative resistance element connected to said two elements for receiving substantially the sum of the currents passing through the two amplifier elements;

a delay means connected between solely one of the amplifier elements and the negative resistance element for receiving the current passing through said one amplifier element;

and means coupled to said signal input terminals for applying inputs to the two amplifier elements for causing the current distributed between them to vary, whereby the resulting change in current through the delay means is delayed from reaching the negative resistance element.

10. A difference amplifier comprising, in combination:

first and second terminals for an operating voltage source;

two transistors, each having an emitter, collector and base both coupled at their emitters to said first terminal;

a tunnel diode coupled at one electrode to said second terminal and at its other electrode directly to one of the collectors and through a coupling means to the other collector for receiving substantially the sum of the currents passing through the two transistors;

a delay means serving as said coupling means for applying the current from said one transistor to said tunnel diode;

and means coupled to the bases of the two transistors for applying a difference in signal potential between said bases for causing the current distributed between said transistors to vary, whereby the resulting change in current in a given sense passing through the delay means is delayed from reaching the tunnel diode, thereby substantially increasing the change in current in an opposite sense, applied to the tunnel diode during the delay interval.

References Cited by the Examiner

UNITED STATES PATENTS

| | | | |
|---|---|---|---|
| 2,736,878 | 2/56 | Boyle | 328—146 X |
| 3,017,613 | 1/62 | Miller. | |
| 3,073,972 | 1/63 | Jenkins | 307—88.5 |

OTHER REFERENCES

"Controlled Rectifier Manual" by General Electric, copyright 1960, pp. 61–62 and Figure 4.20 relied on.

Publication: "IRE Wescon Convention Record," dated August 1959, pp. 8–13, Figure 11, and p. 13 particularly relied on.

ARTHUR GAUSS, *Primary Examiner.*